(12) United States Patent
Holm

(10) Patent No.: US 10,959,411 B2
(45) Date of Patent: Mar. 30, 2021

(54) BOTTOM GRADING APPARATUSES FOR AQUACULTURE SYSTEMS

(71) Applicant: Atlantic Sapphire IP, L.L.C., Miami, FL (US)

(72) Inventor: Thue Holm, Vejle (DK)

(73) Assignee: ATLANTIC SAPPHIRE IP, L.L.C., Miami, FL (US)

( * ) Notice: Subject to any disclaimer, the term of this patent is extended or adjusted under 35 U.S.C. 154(b) by 584 days.

(21) Appl. No.: 15/862,573

(22) Filed: Jan. 4, 2018

(65) Prior Publication Data

US 2019/0200584 A1 Jul. 4, 2019

(51) Int. Cl.
*A01K 61/95* (2017.01)
*A01K 63/00* (2017.01)
*A01K 63/04* (2006.01)

(52) U.S. Cl.
CPC ............ *A01K 61/95* (2017.01); *A01K 63/006* (2013.01); *A01K 63/045* (2013.01)

(58) Field of Classification Search
CPC .................... A01K 61/90; A01K 61/95; A01K 63/00–006; A01K 63/04; A01K 63/045
See application file for complete search history.

(56) References Cited

U.S. PATENT DOCUMENTS

| 2,643,481 | A | * | 6/1953 | Ederer | ................... | A01K 61/90 43/105 |
| 3,200,949 | A | | 8/1965 | Aulich | | |
| 4,009,782 | A | * | 3/1977 | Grimshaw | .............. | B07C 5/342 209/551 |
| 4,052,960 | A | | 10/1977 | Birkbeck et al. | | |
| 4,067,809 | A | | 1/1978 | Kato | | |
| 4,394,259 | A | * | 7/1983 | Benny | .................... | A01K 79/00 209/143 |

(Continued)

FOREIGN PATENT DOCUMENTS

| CN | 102329055 A | 1/2012 |
| JP | H01112935 A | 5/1989 |

(Continued)

OTHER PUBLICATIONS

García-Bengochea, José I et al., "Deep Wall Disposal of Waste Waters in Saline Aquifers of South Florida", Abstract, American Geophysical Union Water Resources Research, vol. 6, Issue 5, Oct. 1970, 1 page.

(Continued)

*Primary Examiner* — Magdalena Topolski
*Assistant Examiner* — Marisa V Conlon
(74) *Attorney, Agent, or Firm* — Malloy & Malloy, P.L.

(57) ABSTRACT

Bottom grading apparatuses for aquaculture systems are disclosed herein. An example system includes a vessel filled with water that receives fish, the vessel having a bottom surface with drain; a plenum in fluid communication with the vessel; a multiway valve in fluid communication with the plenum, a mortality pipe, and a grading pipe; and a mortality container in fluid communication with the mortality pipe and the vessel, wherein the fish can re-enter the vessel through the mortality container and deceased fish remain in the mortality container, wherein when the multiway valve is closed to the mortality pipe, the fish will divert through the grading pipe.

5 Claims, 2 Drawing Sheets

(56) References Cited

U.S. PATENT DOCUMENTS

| | | | |
|---|---|---|---|
| 4,607,595 A * | 8/1986 | Busot | A01K 61/90 119/213 |
| 4,728,438 A | 3/1988 | Featherstone | |
| 4,966,096 A | 10/1990 | Adey | |
| 5,123,195 A * | 6/1992 | Hawkins | A01K 61/90 43/9.2 |
| 5,317,645 A | 5/1994 | Perozek et al. | |
| 5,385,428 A * | 1/1995 | Taft, 3rd | E02B 1/006 405/81 |
| 5,659,977 A | 8/1997 | Jensen et al. | |
| 5,732,654 A | 3/1998 | Perez | |
| 5,961,831 A | 10/1999 | Lee | |
| 5,978,315 A | 11/1999 | Molaug | |
| 6,041,738 A | 3/2000 | Hemauer et al. | |
| 6,206,612 B1 | 3/2001 | Meyer | |
| 6,317,385 B1 | 11/2001 | Hedgepeth | |
| 6,382,134 B1 | 5/2002 | Gruenberg et al. | |
| 6,443,098 B1 | 9/2002 | Blyth et al. | |
| 6,447,681 B1 | 9/2002 | Carlberg et al. | |
| 6,474,264 B1 | 11/2002 | Grimberg et al. | |
| 6,499,431 B1 | 12/2002 | Lin | |
| 6,722,314 B1 | 4/2004 | Crisinel et al. | |
| 6,932,025 B2 * | 8/2005 | Massingill | A01K 63/04 119/216 |
| 6,986,323 B2 | 1/2006 | Ayers | |
| 7,001,519 B2 | 2/2006 | Linden et al. | |
| 7,082,893 B2 | 8/2006 | Schreier et al. | |
| 7,462,284 B2 | 12/2008 | Schreier et al. | |
| 7,594,779 B2 * | 9/2009 | Hildstad | E02B 1/006 405/81 |
| 8,117,992 B2 | 2/2012 | Parsons et al. | |
| 8,141,515 B2 | 3/2012 | Nien | |
| 8,633,011 B2 | 1/2014 | Palmer et al. | |
| 9,637,402 B2 | 5/2017 | Tal et al. | |
| 9,756,838 B2 | 9/2017 | Kunitomo et al. | |
| 10,034,461 B2 | 7/2018 | Holm et al. | |
| 10,748,278 B2 * | 8/2020 | Brubacher | G06K 9/00134 |
| 2003/0070624 A1 | 4/2003 | Zohar | |
| 2004/0168648 A1 | 9/2004 | Ayers | |
| 2004/0244715 A1 | 12/2004 | Schreier | |
| 2005/0211644 A1 | 9/2005 | Goldman | |
| 2007/0221552 A1 | 9/2007 | Denney | |
| 2008/0000821 A1 | 1/2008 | Drewelow | |
| 2008/0223788 A1 | 9/2008 | Rimdzius et al. | |
| 2009/0145368 A1 | 6/2009 | Brauman | |
| 2010/0236137 A1 | 9/2010 | Wu et al. | |
| 2010/0269761 A1 | 10/2010 | Nien | |
| 2011/0258915 A1 | 10/2011 | Subhadra | |
| 2012/0125940 A1 * | 5/2012 | Wright | A01K 63/045 220/601 |
| 2012/0184001 A1 | 7/2012 | Stephen et al. | |
| 2013/0098303 A1 | 4/2013 | Jones | |
| 2013/0319342 A1 | 12/2013 | Musser | |
| 2013/0327709 A1 | 12/2013 | Stroot | |
| 2014/0261213 A1 | 9/2014 | Stiles, Jr. et al. | |
| 2015/0230439 A1 | 8/2015 | Harwood | |
| 2015/0342161 A1 | 12/2015 | Sheriff | |
| 2015/0366173 A1 | 12/2015 | Myers | |
| 2018/0125041 A1 | 5/2018 | Holm et al. | |
| 2019/0169046 A1 | 6/2019 | Holm | |
| 2020/0396970 A1 | 12/2020 | Holm et al. | |

FOREIGN PATENT DOCUMENTS

| | | | | |
|---|---|---|---|---|
| WO | WO2002041703 A2 | 5/2002 | | |
| WO | WO2017002081 A1 | 1/2017 | | |
| WO | WO2017153986 A1 | 9/2017 | | |
| WO | WO-2018169412 A1 * | 9/2018 | | B07C 5/34 |

OTHER PUBLICATIONS

Howard. Mark R., "Down the Drain", Florida Trend, Jan. 1, 2000, http://www.floridatrend.com/print/article/13274, 2 pages.

Gorman, J, L. et al., "Economic Feasibility of Utilizing West Alabama Saline Groundwater to Produce Florida Pompano and Hybrid Striped Bass in a Recirculating Aquaculture System", Alabama Agricultural Experiment Station, Auburn University, Dec. 2009, 19 pages.

Milchman, Jon, "Construction/Clearance Permit Application", Florida Department of Environmental Protection ("FDEP"), May 12, 2013, 5 pages.

Haberfeld, Joseph, "Letter Re: First Request for Additional Information (RAI)" Florida Department of Environmental Protection, Jun. 4, 2013, 6 pages.

"Notice of Draft Permit", South Dade News Leader, Homestead, Miami Dade County, Florida, Sep. 13, 2013, 1 page.

"Notice of Permit", Florida Department of Environmental Protection, Nov. 4, 2813, 18 pages.

"Notice of Intent", South Dade News Leader, Homestead, Miami Dade County, Florida, Oct. 18, 2013, 1 Page.

"State of Florida Well Completion Report", Feb. 2015, 23 pages.

Sharrer, Mark J. et al., "Evaluation of geotextile filtration applying coagulant and flocculant amendments for aquaculture biosolids dewatering and phosphorus removal", Aquacultural Engineering, vol. 40, Issue 1, Jan. 2009, 31 pages, <URL:https://www.sciencedirect.com/science/article/pii/S0144860908000678> (Accessed Dec. 4, 2017).

"Recirculation Systems", AKVA Group, 6 pages, <URL:http://www.akvagroup.com/products/land-based-aquaculture/recirculation-systems> (Accessed Dec. 4, 2017).

"Water Source", University of Alaska, Fairbanks, School of Fisheries & Ocean Sciences, 53 pages, <URL:https://www.sfos.uaf.edu/fitc/teaching/courses/fish336/materials/FISH%20336%20Lect%2031%20Water%20Quality%203.pdf> (Accessed Dec. 4, 2017).

Sun, Min et al., "Models for estimating feed intake in aquaculture: A review", Abstract, Computers and Electronics in Agriculture, vol. 127, Sep. 2016 <URL:http://www.sciencedirect.com/science/article/pii/S0168169916304240> (Accessed Dec. 4, 2017), 4 pages.

Van Der Heile, Tony et al. "Composition, Treatment and Use of Saline Groundwater for Aquaculture in the Netherlands," World Aquaculture, Jun. 2014, pp. 23-27.

Storrø, Gaute, "Investigations of salt groundwater at Akvaforsk Research Institute, Sunndalsøra, Norway," Geological Survey of Norway, NGU-rapport 93.029, 1993, 11 pages.

Small, Brian et al. "On the Feasibility of Establishing a Saline Aquaculture Industry in Illinois," Illinois Sustainable Technology Center [online], <URL:http://www.istc.illinois.edu/info/library_docs/TR/TR051.pdf>, Mar. 2014, 46 pages.

* cited by examiner

BOTTOM GRADING APPARATUSES FOR AQUACULTURE SYSTEMS

FIELD OF THE INVENTION

The present technology pertains to aquaculture, and more specifically, but not by limitation to apparatuses and methods of bottom grading of biological species in aquaculture systems through use of a selectively controllable bottom grading system.

SUMMARY

Various embodiments of the present disclosure are directed to a system comprising a vessel filled with water that receives fish, the vessel having a bottom surface with drain; a plenum in fluid communication with the vessel; a multiway valve in fluid communication with the plenum, a mortality pipe, and a grading pipe; and a mortality container in fluid communication with the mortality pipe and the vessel, wherein the fish can re-enter the vessel through the mortality container and deceased fish remain in the mortality container, wherein when the multiway valve is closed to the mortality pipe, the fish will divert through the grading pipe.

Various embodiments of the present disclosure are directed to a method comprising cultivating fish in an aquaculture system, the aquaculture system comprising: a vessel filled with water that receives large sized fish, the vessel having a bottom surface with drain; a plenum in fluid communication with the vessel, the plenum comprising a plenum in fluid communication with a mortality pipe; a multiway valve in fluid communication with the mortality pipe and a grading pipe; and a mortality container in fluid communication with the mortality pipe and the vessel, wherein the fish can re-enter the vessel through the mortality container and deceased fish remain in the mortality container; closing the grading pipe using the multiway valve to allow the fish to flow into the mortality container; and closing the grading pipe using the multiway valve to allow the fish to flow into the grading pipe.

Various embodiments of the present disclosure are directed to a system comprising a vessel filled with water that receives large sized fish, the vessel having a bottom surface with drain; a plenum in fluid communication with the vessel, the plenum comprising a plenum housing having at least two outlet interfaces that each comprise a mortality conduit and a harvesting conduit; and a swiveling junction coupled with the drain, the swiveling junction capable of selective alignment with each of the at least two outlet interfaces.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

The present disclosure is now described more fully with reference to the accompanying drawings, in which example embodiments of the present disclosure are shown. The present disclosure may, however, be embodied in many different forms and should not be construed as necessarily being limited to the example embodiments set forth herein. Rather, these example embodiments are provided so that the disclosure is thorough and complete, and fully conveys the concepts of the present disclosure to those skilled in the art. Also, features described with respect to certain example embodiments may be combined in and/or with various other example embodiments. Different aspects and/or elements of example embodiments, as disclosed herein, may be combined in a similar manner. Further, at least some example embodiments may individually and/or collectively be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity, at least as described herein, in any manner, irrespective of the at least one entity have any relationship to the subject matter of the present disclosure.

Generally described, the present disclosure describes aquaculture systems that include bottom grading features. In some embodiments, a plenum comprising a plurality of conduits is associated with an aquaculture vessel. In some embodiments, a multiway valve allows for selective use of a mortality container and/or a grading system.

In some embodiments, the aquaculture systems disclosed herein can comprise a means for selectively aligning an outlet (e.g., drain) of the vessel with outlet interfaces (e.g., conduits) of the plenum allows for bottom grading of deceased fish and recirculation of live fish.

These and other advantages of the present disclosure are provided in greater detail herein with reference to the collective drawings.

Figure 1:
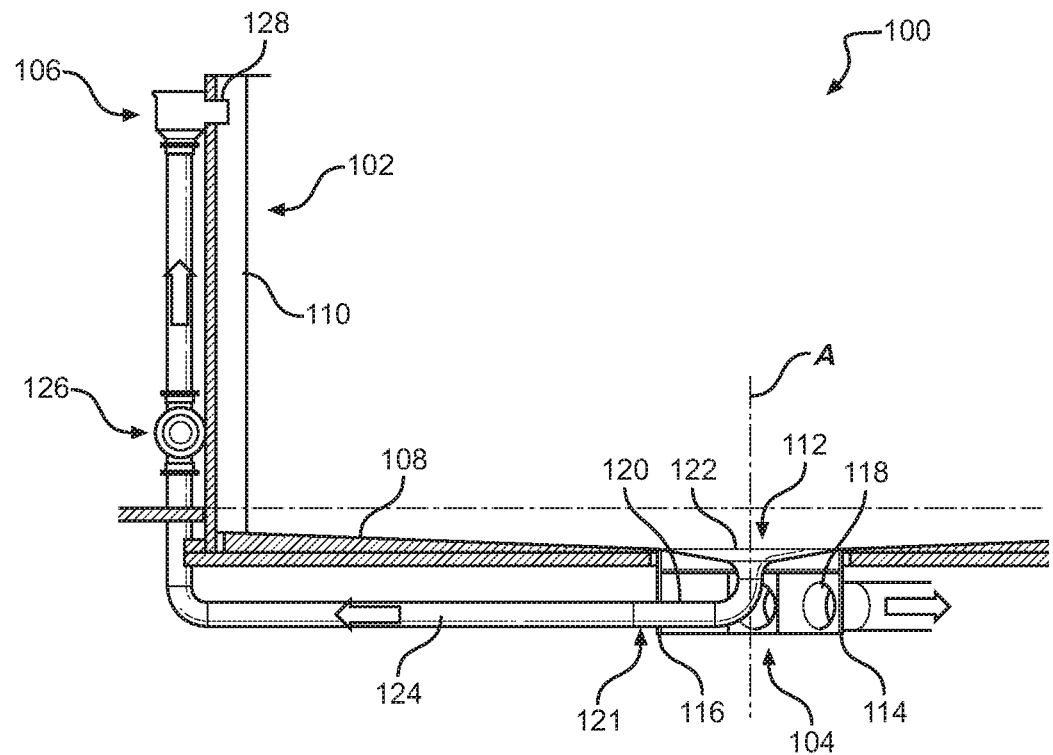
FIG. 1 is a front plan schematic view of an example aquaculture system with a bottom grading system, constructed in accordance with the present disclosure.
Figure 2:
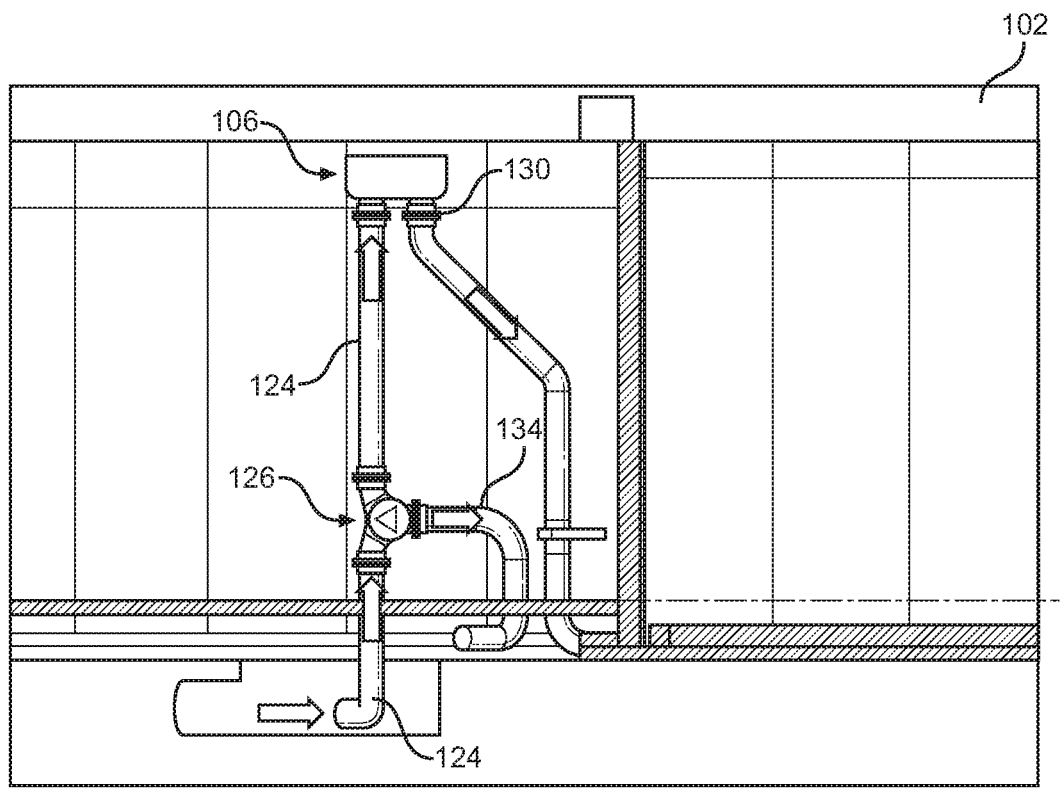
FIG. 2 is a side plan schematic view of the example aquaculture system with a bottom grading system, illustrating a multiway valve.

FIGS. 1 and 2 collectively illustrate an example aquaculture system 100 that comprises an aquaculture vessel 102, a plenum 104, and a mortality container 106 (e.g. morality box). The aquaculture vessel 102 is utilized to cultivate large fish such as salmon in a fluid such as seawater. The aquaculture vessel 102 has a particular configuration and shape in some embodiments. For example, in one or more embodiments, the aquaculture vessel 102 includes a bottom surface 108 that slopes downwardly from an outer sidewall 110 to an outlet 112 or a drain. In some embodiments the outlet 112 is aligned with a central axis A of the aquaculture vessel 102. The angle of the bottom surface 108 can also be defined relative to the central axis A.

In operation, as fish are cultivated and grow in the aquaculture vessel 102, some fish may die. The deceased fish will fall to the bottom of the aquaculture vessel 102. The sloped configuration of the bottom surface 108 ensures that these deceased fish will be directed into the outlet 112. In another function, the sloped configuration of the bottom surface 108 ensures that live fish will aggregate near the outlet 112 when the fish are selected for either grading or harvesting. To be sure, the "harvesting" of fish can include any operation in which live fish are moved out of the aquaculture vessel 102, which can include moving the fish into another vessel or otherwise. Grading requires movement of the fish into a grading pipe through use of a valve, which is disclosed in greater detail infra.

The plenum 104 comprises a housing or enclosure 114. Two or more conduits, such as a mortality conduit 116 and a harvesting conduit 118 can be included in the plenum 104. Additional conduits can be utilized in some embodiments. A junction 120 is coupled to the outlet 112 of the aquaculture vessel 102. In some embodiments, the junction 120 is a j-shaped member having a nozzle end 121 that aligns with one or more of the various conduits of the plenum 104.

In some embodiments, the junction 120 can swivel to selectively align with the two or more conduits of the plenum 104. For example, the junction 120 can selectively align with each of the mortality conduit 116 and the harvesting conduit 118. To transmit the fish out of the aquaculture vessel 102, the junction 120 (e.g. a swiveling junction) can be aligned with the harvesting conduit 118 and fish can exit through the harvesting conduit 118 by way of the junction 120 (e.g. a swiveling junction).

In some embodiments, the outlet 112 has a funnel configuration or shape in area 122 that terminates at a connection to one end of the junction 120.

The aquaculture system 100 in some embodiments comprises a mortality pipe 124 that is a pathway of fluid communication between the mortality conduit 116 and the mortality container 106. In one embodiment, the mortality pipe has a first section that extends between the junction 120 and a multiway valve 126 (e.g. three-way valve) and a second section that extends between the multiway valve 126 and the mortality container 106. In some embodiments, the multiway valve 126 is located in-line with the mortality conduit 116.

The mortality container 106 comprises an enclosure that is in fluid communication with the mortality pipe 124. The mortality container 106 is fed from underneath by the mortality pipe 124 in some instances. In some embodiments, the mortality container 106 is accessible from an upper end so as to allow for removal of decease fish that are trapped inside the mortality container 106. In one or more embodiments, the mortality container 106 is positioned near an upper end of the aquaculture vessel 102.

In various embodiments, the mortality container 106 comprises a shunt 128 that extends into the aquaculture vessel 102. The shunt 128 allows live fish traveling through the mortality pipe 124 to re-enter the aquaculture vessel 102.

According to some embodiments, the mortality container 106 comprises a filter section output conduit 130. The filter section output conduit 130 allows for seawater in the mortality container 106 to be directed to one or more filtering assemblies for treatment.

In some embodiments, the multiway valve 126 is coupled with a grading pipe 134. In some instances, fish can be diverted through the grading pipe 134 for analysis when the multiway valve 126 is closed to the mortality container 106. In general, the multiway valve 126 comprises a first outlet that couples with the mortality container 106 and a second outlet that couples with the grading pipe 134.

In operation, when fish are being cultivated in the aquaculture vessel 102, the junction 120 (e.g. a swiveling junction) is aligned with the mortality conduit 116 and the multiway valve 126 is configured so that the grading pipe 134 is closed and the mortality pipe 124 is open. This configuration allows both live and dead fish to circulate through the mortality container 106. Deceased fish remain in the mortality container 106 and live fish can re-enter the aquaculture vessel 102 through the shunt 128 between the mortality container 106 and the aquaculture vessel 102.

It will be understood that as deceased fish remain in the mortality container 106, the deceased fish may give off contaminates that affect seawater quality. Thus, a pump can be used to draw seawater in the mortality container 106 into the filter section output conduit 130. The seawater can be cleaning using any number of cleaning techniques such as drum filtering, biofiltering, trickling, and so forth.

When grading of fish is desired, an operator or control system can be configured to switch the multiway valve 126 so that the grading pipe 134 is open and the mortality pipe 124 is closed. Live fish (and in some instances deceased fish) are directed through the grading pipe 134.

Figure 3:
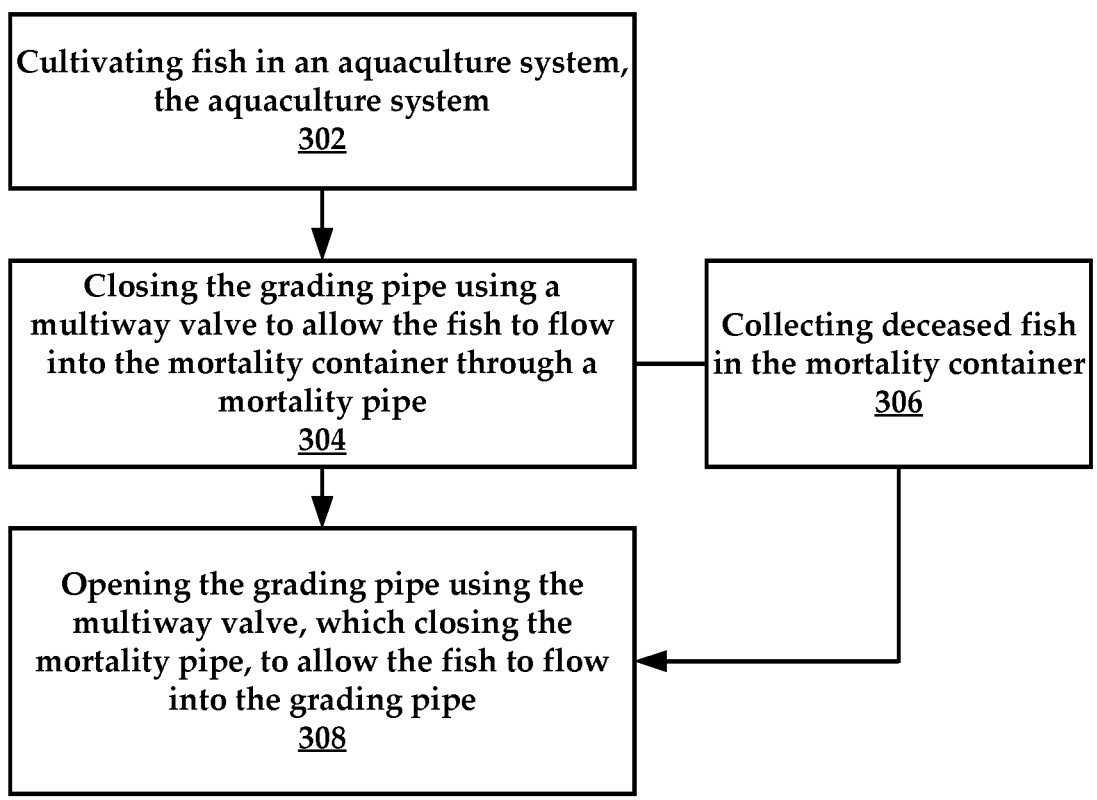
FIG. 3 is a flowchart of an example method of aquaculture system operation and bottom grading performed in accordance with the present disclosure.

FIG. 3 is a flowchart of a method for bottom grading of fish in an aquaculture system. The method includes a step 302 of cultivating fish in an aquaculture system. The aquaculture system comprises the features of the aquaculture systems described above in various embodiments. When cultivating the fish in the vessel, deceased fish can be collected in a mortality container. This is facilitated by a step 304 of closing the grading pipe using a multiway valve to allow the fish to flow into the mortality container through a mortality pipe. This step incidentally allows live fish to re-enter the vessel through a shunt in the mortality container. Thus, the method includes a step 306 of collecting deceased fish in the mortality container.

When an operator desires to grade a portion of the fish in the vessel, the method includes a step 308 of opening the grading pipe using the multiway valve, which closes the mortality pipe, to allow the fish to flow into the grading pipe.

The method can include allowing deceased and live fish to travel through a junction into mortality container by way of a mortality pipe extending between the mortality container and the mortality conduit. As noted above, the junction couples with a drain or outlet of the vessel. In some embodiments, the method includes grading the deceased fish according to accepted standards that would be known to one of skill in the art.

In some embodiments, the movement of fish and seawater through the aquaculture system is facilitated through the use of one or more pumps that push or pull water through the various components and pipes of the aquaculture system.

In some embodiments, the method can include selectively re-aligning the junction with a harvesting conduit, in embodiments where the junction comprises a swiveling junction.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three dimensional (3D) printing, laser cutting, computer numerical control (CNC) routing, milling, pressing, stamping, vacuum forming, hydroforming, injection molding, lithography and/or others.

Any and/or all elements, as disclosed herein, can include, whether partially and/or fully, a solid, including a metal, a mineral, a ceramic, an amorphous solid, such as glass, a glass ceramic, an organic solid, such as wood and/or a polymer, such as rubber, a composite material, a semiconductor, a nano-material, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A system comprising:
    a vessel filled with water that receives fish, the vessel having a bottom surface with drain;
    a plenum in fluid communication with the vessel, the plenum comprising a plenum housing having at least two outlet interfaces that comprise a mortality conduit and a harvesting conduit;
    a multiway valve in fluid communication with the plenum, a mortality pipe, and a grading pipe;
    a mortality container in fluid communication with the mortality pipe and the vessel, wherein the mortality container is positioned near an upper end of the vessel; and
    a shunt fluidly connecting the mortality container to the vessel, wherein the fish can re-enter the vessel from the mortality container through the shunt, and deceased fish remain in the mortality container, and
    wherein when the multiway valve is closed to the mortality pipe, the fish will divert through the grading pipe.

2. The system according to claim 1, wherein the bottom surface of the vessel is sloped towards a central axis of the vessel.

3. The system according to claim 1, wherein the mortality container comprises a filter section output conduit.

4. The system according to claim 3, wherein the shunt extends into the vessel, the shunt allowing live fish traveling through the mortality pipe to re-enter the vessel.

5. The system according to claim 1, wherein the multiway valve comprises a first outlet that couples with the grading pipe and a second outlet that couples the mortality pipe.

* * * * *